United States Patent [19]

Hannan

[11] 3,778,128

[45] Dec. 11, 1973

[54] GATED HOLOGRAPHIC CODING SYSTEM FOR REDUCING ALIGNMENT REQUIREMENTS

[75] Inventor: William James Hannan, Pennington, N.J.

[73] Assignee: RCA Corporation, New York, N.Y.

[22] Filed: May 30, 1972

[21] Appl. No.: 257,680

[52] U.S. Cl. .................... 350/3.5, 356/152, 356/172

[51] Int. Cl. .................... G02b 27/00

[58] Field of Search .................... 350/3.5; 250/201; 356/141, 152, 172, 71; 340/173 LT

[56] References Cited

UNITED STATES PATENTS

| | | | |
|---|---|---|---|
| 3,519,322 | 7/1970 | Brooks et al. | 350/3.5 |
| 3,630,592 | 12/1971 | Cooper | 350/3.5 |
| 3,723,012 | 3/1973 | Storck et al. | 350/3.5 |
| 3,449,577 | 6/1969 | Kogelnik | 350/3.5 |

*Primary Examiner*—David Schonberg
*Assistant Examiner*—Ronald J. Stern
*Attorney*—Edward J. Norton; Joseph D. Lazar and Donald E. Mohoney

[57] ABSTRACT

Holographic techniques are used to encode and decode information. The image of a point source of light is used to trigger an image sensor into detecting the decoded information when the relative encoding coordinates between a code plate and hologram are reestablished in a decoding apparatus.

2 Claims, 5 Drawing Figures

GATED HOLOGRAPHIC CODING SYSTEM FOR REDUCING ALIGNMENT REQUIREMENTS

BACKGROUND OF THE INVENTION

1. Field of the Invention

This invention relates to encoding and decoding information using holographic techniques.

2. Description of the Prior Art

Secrecy in the transmission of information can be provided by utilizing known holographic techniques. Prior art holographic encoding and decoding apparatus and methods have been disclosed in U.S. Pat. No. 3,519,322. The prior art methods and apparatus require the reestablishment of relative encoding coordinates between a code plate and hologram in the decoding apparatus before the reconstructed image of the information can be detected. This requirement may prove to be difficult if not impractical for applications requiring numerous decoding apparatus such as for encoded holographic identification cards.

SUMMARY OF THE INVENTION

A method of encoding and decoding information using holographic techniques is disclosed. A first beam of spatially coherent monochromatic light at a given frequency is transmitted through an information bearing transparency and then through an optical encoder. A second similar light beam is focused to a point source of light in the plane of the information bearing transparency and is also transmitted through the encoder. The first and second light beams intersect a third similar light beam at a recorder sensitive to the intersecting light beams. The recorder is processed to form a hologram of the intersecting light beams. The information is decoded by use of a fourth beam of spatially coherent monochromatic light at the same frequency as the given frequency. The fourth beam is transmitted through the hologram and then through an optical decoder, which is identical to the optical encoder, to reconstruct the image of the information bearing transparency and the point source of light. An electric signal is generated by a light detector sensitive to the image of the point source of light. The generated electric signal activates an image sensor that detects the reconstructed image of the information bearing transparency.

DESCRIPTION OF THE PREFERRED EMBODIMENT

Figure 1:
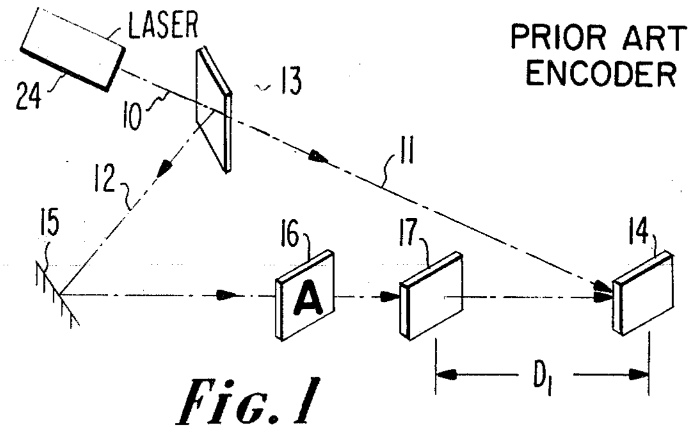
FIG. 1 is a sketch of prior art information encoding apparatus using holographic techniques.

Holographic techniques provide a valuable tool for encoding and decoding information. Referring to FIG. 1, there is shown a known information encoding apparatus using holographic techniques. The resulting hologram may be used as a holographic card having information that can only be decoded by specific decoding apparatus. The prior art encoding apparatus operates as follows. A beam of spatially coherent monochromatic light 10 is divided into a first component beam 11 or reference beam and a second component beam 12 or object beam by a beam splitting half mirror 13. A helium-neon or ruby laser is an example of a source of spatially coherent monochromatic light. The first and second beams 11 and 12 are directed onto recording film 14 sensitive to the laser generated light. The second component beam 12 is directed toward the recording film 14 along a beam path from the half mirror 13 and mirror 15 through an object transparency 16, having a message which is desirous of being holographed, and a recording code plate 17. The code plate 17 may be a simple piece of frosted glass or opal glass. The object beam 12 and the reference beam 11 cause an interference pattern which is recorded on the recording film 14. This recorded interference pattern is called a hologram.

Figure 2:
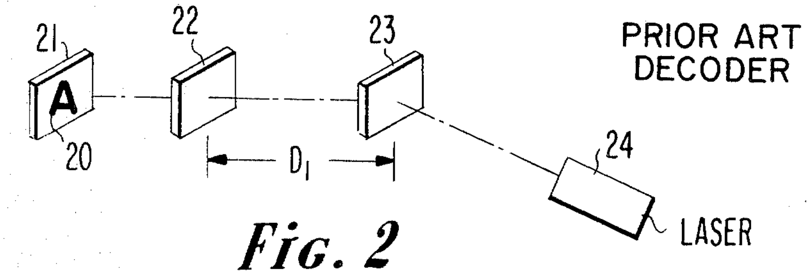
FIG. 2 is a sketch of prior art information decoding apparatus using holographic techniques.

FIG. 2 illustrates a known apparatus used to read out or decode the holographic identification card. The recording film 14, with the interference pattern, is developed and the resulting hologram 23 is illuminated with a laser 24 at the same frequency as the laser 24 used in recording the hologram and may be the same laser. The light from the laser 24 is incident on the hologram 23 at the same incident angle as the reference beam 11 used in recording the hologram 23. The light energy emerging from the hologram 23 is used to provide an image 20 of the message contained in the object transparency 16. The image 20 can be focused onto an image sensor 21 or seen by the unaided eye. However, before the image 20 of the message can be clearly reconstructed by the read out apparatus, it is necessary to use a read out code plate 22 that is the same or identical to the recording code plate 17. Also, it is necessary not only to reestablish the distance $D_1$ between the read out code plate 22 and the hologram 23 which was used in encoding the information, but also the relative coordinates between the read out code plate 22 and hologram 23 must be substantially the same as the relative coordinates between the recording code plate 17 and the recording film 14. The reestablishment of the relative position and coordinates between the read out code plate 22 and hologram 23 as those used in the recording apparatus is critical for effective decoding. It is obvious because of the multiple degrees of freedom for the code plate 22 with respect to the hologram 23 that this requirement would impose severe mechanical tolerances on whatever mechanical apparatus is used to hold and position the code plate 22 with respect to the hologram 23 in the decoding apparatus.

Figure 3:
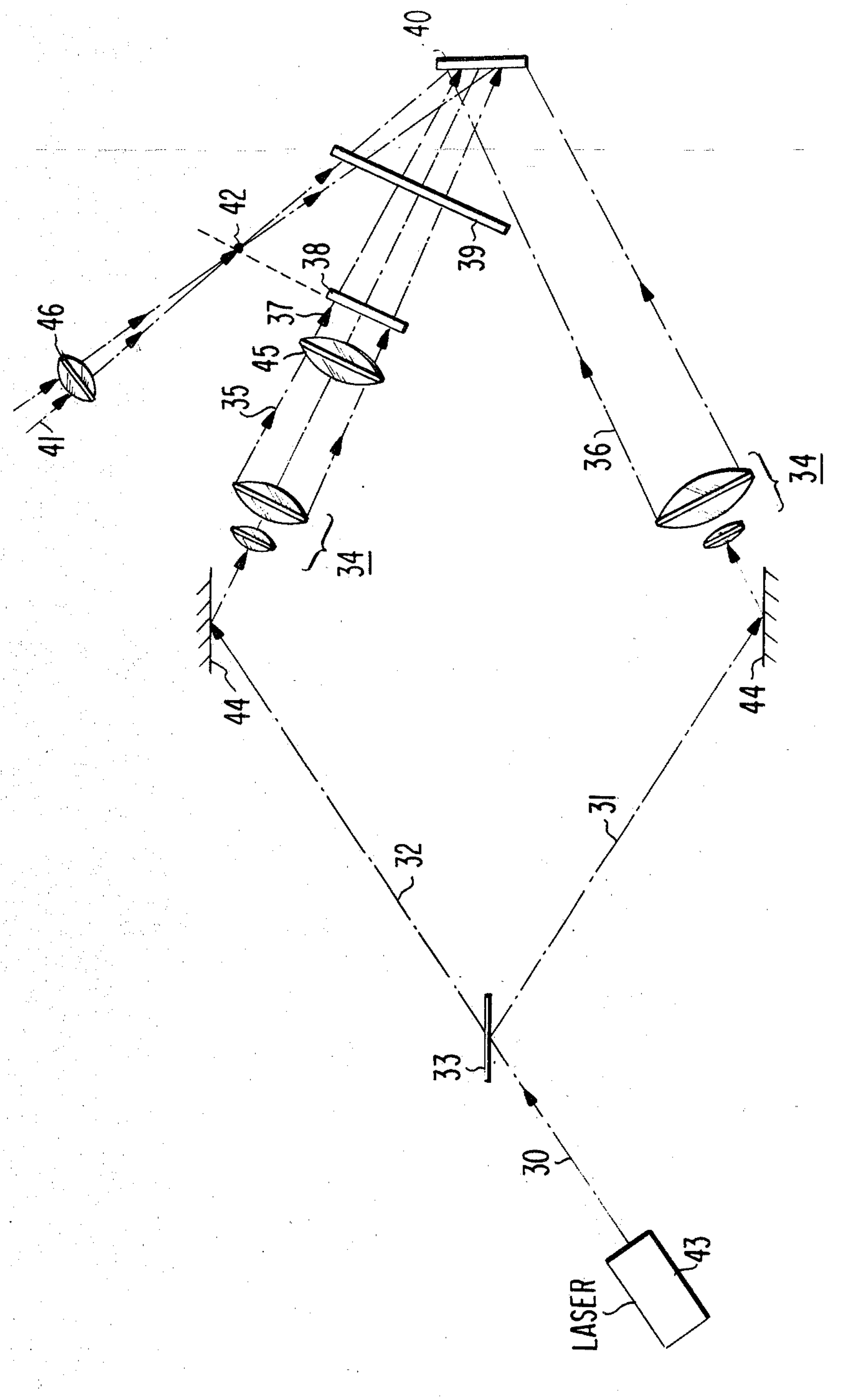
FIG. 3 is a sketch of an improved information encoding apparatus using holographic techniques.

Referring to FIG. 3, there is shown an improved encoding apparatus for a holographic identification card that eases the mechanical tolerances required for an efficient decoding apparatus. A beam of spatially coherent monochromatic light 30 from a laser 43 is divided into a reference beam 31 and an object beam 32 by a beam splitting half mirror 33. Both the object and reference beams 32 and 31 are reflected by mirrors 44 and expanded by beam expanding lenses 34 into magnified object and reference beams 35 and 36. The magnified object beam 35 impinges upon a large aperture lens 45, which is effective in producing therefrom a convergent object beam 37. The message being encoded is on an object transparency 38 in the path of the convergent object beam 37. A code plate 39 is also in the path of the convergent object beam 37 between the object transparency 38 and the recording film 40. The convergent object beam 37 is directed through the object transparency 38 and code plate 39 and is recorded together with the magnified reference beam 36 on the recording film 40 as an interference pattern. The developed interference pattern is an encoded hologram of the information contained in the object transparency 38. However, this encoded hologram is different from the encoded hologram of the prior art because a second spatially coherent monochromatic light beam 41 from a source, not shown, is focused by a lens 46 to form a point source of light 42 in the plane of the object transparency 38 and is referred to as a point object. The second beam 41 is transmitted through the code plate 39 and is also recorded on the recording film 40 as part of the interference pattern. The point object or point source of light 42 is now part of the encoded information contained in the resulting hologram. The second light beam 41 may be from a second laser or from laser 43. If a second laser is used to provide the second light beam 41, it must also provide a second reference beam. Optical techniques well known in the art could be adapted to utilize laser 43 as the source of light energy for the second light beam 41.

Figure 4:
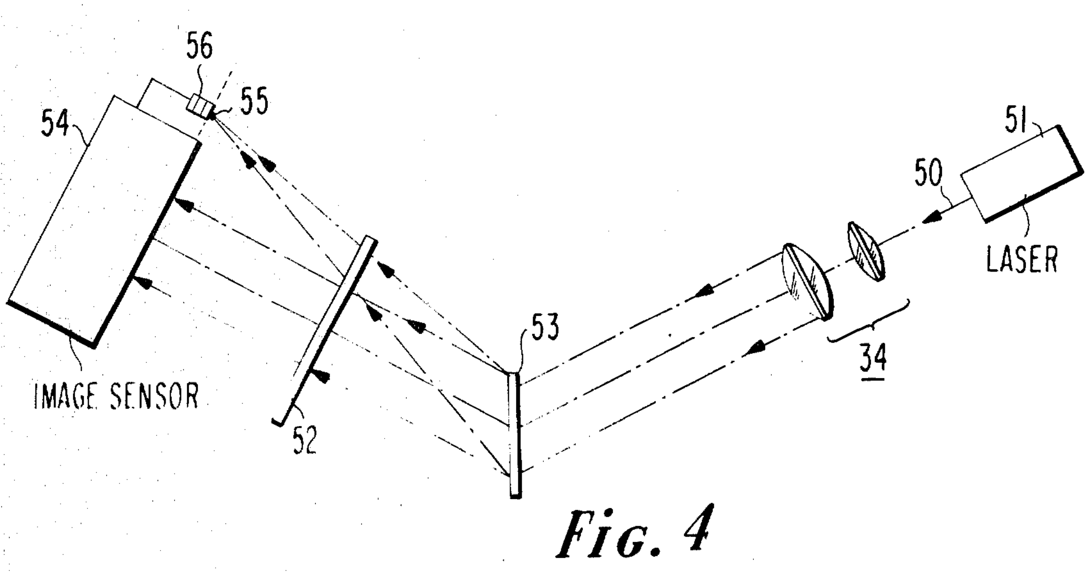
FIG. 4 is a sketch of an improved information decoding apparatus using holographic techniques.

Referring to FIG. 4, there is shown an improved decoding apparatus for the encoded hologram 53 recorded by the encoding apparatus of FIG. 3. A read out beam 50 from a laser 51 at the same frequency as the recording laser 43, is used to illuminate the encoded hologram 53. The read out beam 50 is incident on the hologram 53 at the same angle as the reference beam 36 used in recording the hologram 53. A read out code plate 52 identical to the recording code plate 39 is in the beam path of the light emerging from the hologram. The read out code plate 52 is located between the hologram 53 and an image sensor 54. An example of a well known image sensor 54 is a gated vidicon. The reestablishment of the relative position and coordinates between the read out code plate 52 and hologram 53 used in recording the hologram 53 is still critical in this improved decoding apparatus. However, the mechanical tolerances on the hologram and code plate holders, not shown, used for the reestablishment of the relative coordinates are not critical to the point of impracticality. An example of a code plate or hologram holder would be a four sided structure in the form of a rectangle having one side removable for the purpose of inserting the code plate or hologram. The inner walls of the holder would be slotted to permit movement of the code plate or hologram. Electronic means are used to provide an indication of the reestablishment of the relative recording coordinates. The code plate 52 is moved or wobbled within its holder, not shown, until the critical reestablishment of its relative recording coordinates is attained. Once this reestablishment is accomplished, the point image 55 of the point source of light 42 recorded in the encoding operation is reconstructed. The point image 55 is then detected by the photodiode 56. The photodiode 56 generates an electric signal that gates or turns on the image sensor 54. A sensing device such as a gated vidicon could be used for this application. In effect, the decoded image is sampled at the wobbling rate of the code plate 52. Flicker which might be associated with the sampling rate can be avoided by using a gated vidicon 54 having a relatively long storage time. If the read out code plate 22 of the prior art decoder was wobbled, the continuously operating image sensor 22 would be detecting speckle noise until the critical reestablishment of the relative recording coordinates. The continuously detected speckle noise would blur or obliterate the desired image for the short time interval that the recording coordinates are reestablished. Thus, an efficient reconstruction of an image of the decoded information would be frustrated.

Numerous code plate designs and other optical techniques can be used in encoding the information. For example, if a diffused hologram were desired, a diffusing glass would be located in front of the object transparency in the path of the object beam in the conventional recording apparatus illustrated in FIG. 1. The diffusing glass or diffuser would cause light from every point on the object transparency to be spread over the entire resulting hologram. Every point on the hologram would then contain the information in the entire object transparency. Therefore, a complete image can be reproduced from any part of the hologram. A diffused hologram could be encoded by use of first and second complementary code plates in the improved recording apparatus of FIG. 3 to make a doubly-exposed diffused hologram.

Figure 5:
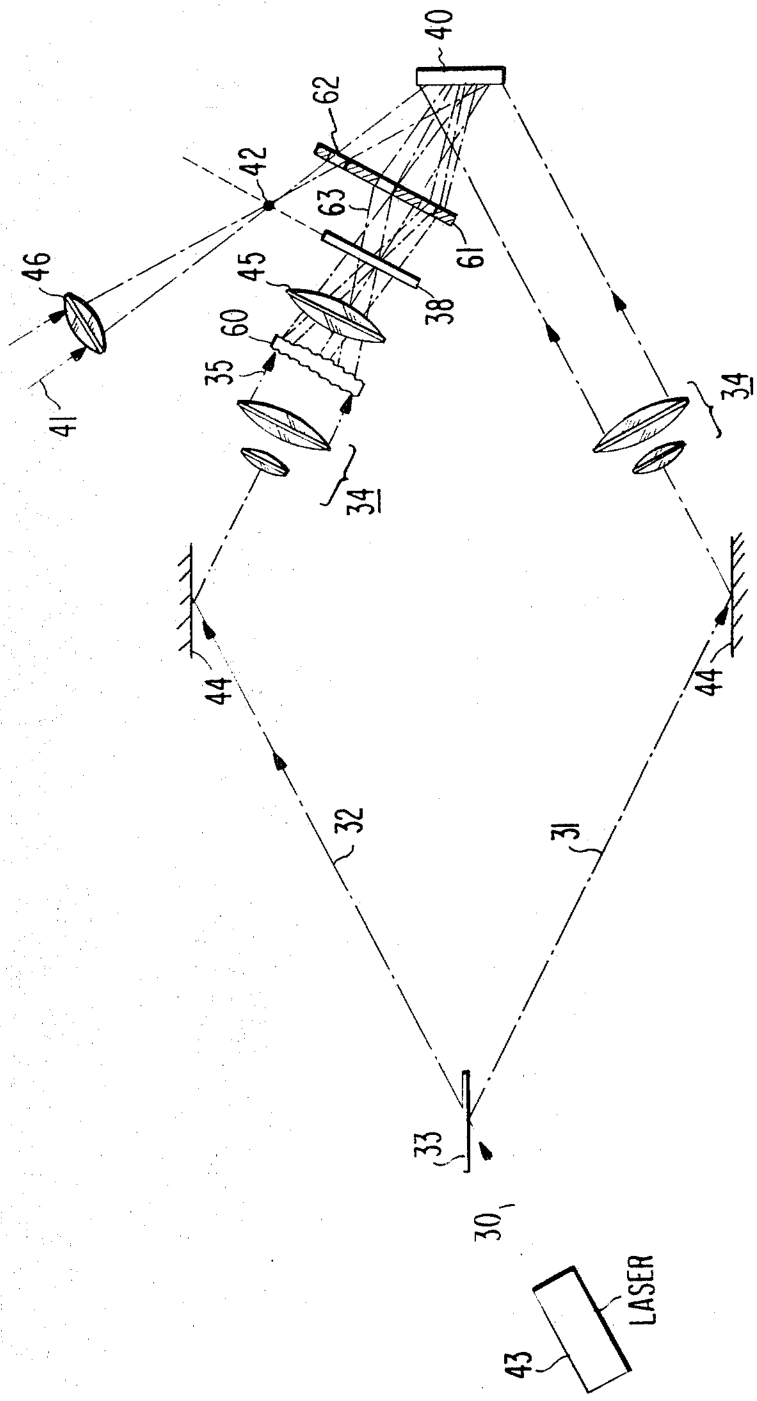
FIG. 5 is a sketch of an improved encoding apparatus using a diffused hologram.

Referring to FIG. 5, there is shown an embodiment of the improved recording apparatus that would allow encoding of diffused holograms. The components and operation of the improved recording apparatus of FIG. 5 are similar to FIG. 3. However, the addition of a diffuser 60 having an irregular surface, for example, causes an erratic dispersion of the object beam. The diffuser 60 allows the recording of a diffused hologram. The diffused object beam 63 emerging from the information bearing transparency 38 is incident on a first recording code plate 61. The first recording code plate 61 has randomly located transparent holes 62 that permits holographic information to be recorded by the recording film 40 at locations corresponding to the locations of the code plate 61 transparent holes 62. A second laser beam 41 from a source, not shown, is focused by a lens 46 to a point source of light 42 in the plane of the information bearing transparency 38 and is referred to as a point object. The second beam is also transmitted through the transparent holes 62 of the recording code plate 61 and is recorded on the recording film 40 as part of the interference pattern. A second exposure of the recording film 40 is made of speckle noise or a false message without the object transparency 38 or second beam 41 as part of the recording apparatus. The second exposure is made when the first recording code plate 61 is replaced by a second complementary recording code plate which is transparent at locations where the first recording code plate 61 was opaque and opaque where code plate 61 had transparent holes.

Decoding of the encoded diffused hologram could be accomplished by the read out apparatus of FIG. 4. The first recording code plate 61 would be the one used in the read out apparatus of FIG. 4. It should be appreciated that the recording apparatus of FIG. 5 is only another example of encoding and decoding of information using holographic techniques. The difficulties of reestablishing relative coordinates between code plate and recording film still exists when reconstructing an image from a diffused hologram. This problem is minimized by the improved recording apparatus of FIG. 5 and the improved read out apparatus of FIG. 4.

As an example of another embodiment, not shown, two lasers are used in the improved encoding and decoding apparatus of FIGS. 3, 4 and 5. A first laser is used to aid the recording of the point source of light and the reconstruction of the point source image. A second laser is used to aid the recording of the encoded information and to decode the encoded information. In the decoding apparatus, the first laser illuminates the hologram and reconstructs the point source image. A photodiode detects the point source image and generates an electric signal that gates the second laser. The second laser reconstructs the image of the information bearing transparency which is detected by the photosensor.

What is claimed is:

1. A method of encoding and decoding information comprising the steps of:

forming an optical encoder of information;

generating first, second and third beams of spatially coherent monochromatic light at a given frequency;

transmitting said first beam through an information bearing transparency and then through said optical encoder;

focusing said second beam to a point source of light in the plane of said information bearing transparency and then transmitting said second beam through said optical encoder;

transmitting said third beam to intersect said first and second beams, emerging from said optical encoder at a recorder sensitive to said intersecting light beams;

processing said recorder to form a hologram of said intersecting light beams;

generating a fourth beam of spatially coherent monochromatic light at the same frequency as said given frequency;

transmitting said fourth beam through said hologram and then through said optical encoder while wobbling said encoder to reconstruct the image of said information bearing transparency and said point source of light;

generating an electric gating signal from a fixed light detector sensitive to said image of said point source of light when said print image is detected by said detector; and repeatedly detecting said reconstructed image of said information bearing transparency by an image recorder only when said image recorder is activated by said electric gating signal from said light detector.

2. A method of encoding and decoding information comprising the steps of:

forming first and second complementary optical encoders of information;

generating first, second and third beams of spatially coherent monochromatic light at a given frequency;

transmitting said first beam through a beam diffuser, then through an information bearing transparency and then through said first optical encoder;

focusing said second beam to a point source of light in the plane of said information bearing transparency;

transmitting said third beam to intersect said first and second beams, emerging from said first optical encoder, at a recorder sensitive to said intersecting light beams to form a first exposure;

transmitting said first beam for a second time through said beam diffuser and then through said second optical encoder;

transmitting said third beam for a second time to intersect said first beam, emerging from said second optical encoder, at said recorder to form a second exposure;

processing said recorder to form a hologram of said intersecting light beams;

generating a fourth beam of spatially coherent monochromatic light at the same frequency as said given frequency;

transmitting said fourth beam through said hologram and then through said first optical encoder while wobbling said encoder to reconstruct the image of said information bearing transparency and said point source of light;

generating an electric gating signal from a fixed light detector sensitive to said image of said point source of light when said print image is detected by said detector light; and repeatedly detecting said reconstructed image of said image bearing transparency by an image recorder only when said image recorder is activated by said electric gating signal from said light detector.

* * * * *

UNITED STATES PATENT OFFICE
CERTIFICATE OF CORRECTION

Patent No. 3,778,128 Dated December 11, 1973

Inventor(s) William James Hannan

It is certified that error appears in the above-identified patent and that said Letters Patent are hereby corrected as shown below:

Column 6, line 42, Claim 2, change "print" to --point--.

Column 6, line 43, Claim 2, after "detector" omit --light--.

Signed and sealed this 25th day of June 1974.

(SEAL)
Attest:

EDWARD M.FLETCHER,JR.
Attesting Officer

C. MARSHALL DANN
Commissioner of Patents